US012768026B2

(12) United States Patent
Kim et al.

(10) Patent No.: US 12,768,026 B2
(45) Date of Patent: Oct. 20, 2026

(54) YTTRIUM-BASED POWDER FOR THERMAL SPRAYING AND YTTRIUM-BASED THERMAL SPRAY COATING USING THE SAME

(71) Applicant: KoMiCo Ltd., Anseong-si (KR)

(72) Inventors: Dae Sung Kim, Anseong-si (KR); Dong Hun Jung, Anseong-si (KR)

(73) Assignee: KoMiCo Ltd., Anseong-si (KR)

( * ) Notice: Subject to any disclaimer, the term of this patent is extended or adjusted under 35 U.S.C. 154(b) by 466 days.

(21) Appl. No.: 18/457,392

(22) Filed: Aug. 29, 2023

(65) Prior Publication Data

US 2024/0076770 A1 Mar. 7, 2024

(30) Foreign Application Priority Data

Aug. 31, 2022 (KR) ........................ 10-2022-0110108

(51) Int. Cl.

| | |
|---|---|
| ***B32B 15/04*** | (2006.01) |
| ***B32B 17/06*** | (2006.01) |
| ***C09D 1/00*** | (2006.01) |
| ***C09D 5/03*** | (2006.01) |
| ***C09D 5/22*** | (2006.01) |
| ***C09D 7/61*** | (2018.01) |
| ***C23C 4/11*** | (2016.01) |

(52) U.S. Cl.

CPC .................. *C23C 4/11* (2016.01); *C09D 1/00* (2013.01); *C09D 5/033* (2013.01); *C09D 5/22* (2013.01); *C09D 7/61* (2018.01)

(58) Field of Classification Search

CPC .............................................. C04B 2235/3225

USPC .................................................. 428/698, 701

See application file for complete search history.

(56) References Cited

U.S. PATENT DOCUMENTS

| | | | | |
|---|---|---|---|---|
| 11,312,637 | B1 * | 4/2022 | In | C23C 4/12 |
| 2019/0203329 | A1 * | 7/2019 | Ibe | C01F 17/265 |
| 2020/0002799 | A1 * | 1/2020 | Hamaya | C09D 5/033 |
| 2022/0186355 | A1 * | 6/2022 | Kim | B05B 7/226 |

FOREIGN PATENT DOCUMENTS

| | | | |
|---|---|---|---|
| CN | 102560321 | A | 7/2012 |
| CN | 106029949 | A | 10/2016 |
| CN | 109963825 | A | 7/2019 |
| CN | 112771205 | A | 5/2021 |
| CN | 114044674 | A | 2/2022 |
| CN | 114045455 | A | 2/2022 |

(Continued)

OTHER PUBLICATIONS

Office Action of KIPO for Korean application No. 1020220110108, issued on Feb. 18, 2024.

*Primary Examiner* — Lauren R Colgan

(74) *Attorney, Agent, or Firm* — NKL Law; Jae Youn Kim

(57) ABSTRACT

An yttrium-based powder for thermal spraying and an yttrium-based thermal spray coating formed from the yttrium-based powder are proposed. The yttrium-based powder includes an yttrium-based compound and an optimally controlled amount of an oxide additive, $SiO_2$. The yttrium-based powder inhibits formation of black spots or prevents the yttrium-based compound from turning black through plasma spray coating. The yttrium-based powder enables formation of a thermal spray coating with a desired color and improved mechanical properties.

5 Claims, 3 Drawing Sheets

(56) References Cited

FOREIGN PATENT DOCUMENTS

| | | | |
|---|---|---|---|
| CN | 114059000 | A | 2/2022 |
| KR | 10-2019-0122753 | A | 10/2019 |
| KR | 20190122753 | A | 10/2019 |
| KR | 10-2020-0120537 | A | 10/2020 |
| KR | 10-2266656 | B1 | 6/2021 |
| KR | 102266658 | B1 | 6/2021 |
| TW | 202223119 | A | 6/2022 |
| TW | 202223120 | A | 6/2022 |
| WO | 2018052129 | A1 | 3/2018 |

* cited by examiner

YTTRIUM-BASED POWDER FOR THERMAL SPRAYING AND YTTRIUM-BASED THERMAL SPRAY COATING USING THE SAME

CROSS REFERENCE TO RELATED APPLICATION

The present application claims priority to Korean Patent Application No. 10-2022-0110108, filed Aug. 31, 2022, the entire contents of which is incorporated herein for all purposes by this reference.

BACKGROUND OF THE INVENTION

1. Field of the Invention

The present invention relates to an yttrium-based thermal spraying powder allowing control of the color of a thermal spray coating, forming a high density yttrium-based thermal spray coating exhibiting good mechanical properties, and inhibiting black spots or blackening of an yttrium-based compound during a thermal spraying process. In addition, the present invention relates to an yttrium-based thermal spray coating formed from the same powder.

2. Description of the Related Art

Among the manufacturing processes for semiconductor devices, a plasma dry etch process becomes increasingly important to enable micromachining for high integration of circuits on a substrate such as a silicon wafer. In this environment, various methods to increase the life of parts of process chambers have been proposed. For example, the parts of process chambers are made of a plasma-resistant material, or the surface of the parts is coated with be a plasma-resistant material.

Among the methods, a method of imparting new functionality by coating the surface of a substrate with various materials has been conventionally used in various fields. As a surface coating technique, a thermal spraying method is known in which spraying particles made of a ceramic material or the like are softened or melted by combustion or electrical energy, and the softened or melted particles are sprayed to form a coating.

In addition, in the field of manufacturing semiconductor devices and the like, it is practical to perform fine processing such as dry etching using plasma of a halogen-based gas such as fluorine, chlorine, bromine, etc., on the surface of a semiconductor substrate. After the dry etching, the semiconductor substrate is extracted from the chamber (vacuum container), and the inside of the chamber is then cleaned using plasma of oxygen gas. In this case, internal chamber parts exposed to highly reactive plasma of oxygen gas or halogen gas are likely to be corroded. Therefore, a material of the internal chamber part at the corroded region is detached to generate particles, and the particles as foreign matter may attach to a semiconductor substrate and cause defects in the circuits on the semiconductor substrate.

Therefore, for the purpose of reducing the generation of particles in a semiconductor device manufacturing apparatus, conventionally, the members of the apparatus that are likely to be exposed to plasma of oxygen gas or halogen gas have been coated with an anticorrosive ceramic coating through thermal spraying.

In addition to exfoliation of reaction products attached to the surface of a vacuum chamber, deterioration of the vacuum chamber due to the use of halogen gas plasma or oxygen gas plasma also contributes to the generation of particles in the vacuum chamber. According to the study conducted by the present inventors, the number and size of particles generated from a thermal spray coating in a dry etching environment depend on the bonding strength between the particles constituting the thermal spray coating, the presence of incompletely melted particles in the thermal spray coating, and the porosity of the thermal spray coating.

As the density of a ceramic thermal coating increases, the degree of adsorption of $CF_x$-based process gases caused by defects such as pores in a dry etching process decreases, and thus etching by plasma ion bombardment can be reduced.

Korean Patent Application Publication No. 10-2020-0120537 (publication date: Oct. 21, 2020) discloses a thermal spraying powder including a rare earth element (R), aluminum, and oxygen in the form of a rare earth aluminum monoclinic crystal phase ($R_4Al_2O_9$) and a rare earth oxide crystal phase ($R_2O_3$) which have high corrosion resistance and reduce the amount of particles generated when the powder reacts with halogen-based gas plasma. Therefore, the powder exhibits excellent plasma etching resistance.

Korean Patent No. 10-2266656 (registration date: Jun. 14, 2021) discloses an yttrium-based powder for thermal spraying, the powder containing an yttrium-based compound powder and a silica powder, in which the content of a Y—Si—O intermediate phase is greater than 0 wt % and less than 10 wt %. This powder increases the coating density of a thermal spray coating, thereby reducing the etching rate in a dry etching process.

However, the thermal spray coatings formed according to the technologies disclosed in the documents suffered a phenomenon in which the formed coatings display locally different colors ranging from white to black (hole defects due to color center) after undergoing plasma etching. When the distance between a base member and a plasma gun is insufficient during thermal spraying, since the travel distance of the melted particles is short (insufficient), deoxidation occurs due to the lack of oxygen supply, and the yttrium-based compound turns black, or black spots occur.

Such black spots or black-colored coatings may lead to difficulty in distinguishing between process contaminants and the coatings, resulting in excessive cleaning of the coatings. That is, part of the coatings is undesirably removed. For this reason, the plasma resistance of the coatings is reduced, or plasma radiation absorptivity of the coating changes during an etching process. Thus, the process conditions need to be adjusted.

That is, when color irregularity occurs for some reasons such as the formation of black spots in thermal spray coatings, the radiation absorptivity of the coatings becomes irregular, leading to unevenness in temperature and thermal expansion of the coatings, resulting in the generation of thermal stress. The thermal stress causes the generation of particles and the peeling-off of the coatings. When the coatings become black, radiation is easily absorbed by the coatings, so that the temperature of the coatings increases, and the etching rate of the coatings accordingly increases.

In addition, since a deoxidized region in the thermal spray coating does not have perfect stoichiometry, the region is energetically unstable, and thus the etching rate locally increases.

Therefore, various measures have been taken to prevent black spots or black-colored coatings and to change the color of coatings from black to white.

One of the measures is heat treatment of thermal spray coatings. However, this method has problems that when a base member is oxidized in an oxygen atmosphere during the heat treatment, the base member is melted or deformed due to a high-temperature heat treatment process, the coating is peeled off due to difference in thermal expansion between the coating and the base member.

On the other hand, Korean Patent Application Publication No. 10-2019-0122753 (publication date: Oct. 30, 2019) discloses a technique of coloring a rare earth fluoride to white, gray, or black. In the technique, a thermal spray coating is formed on a yttrium fluoride and/or an yttrium oxyfluoride, through thermal spraying of a thermal spraying powder containing carbon or titanium or molybdenum so that a white color or a color in between gray and black, represented by an L* value of 25 to 64 or 25 to 91, an a* value of −3.0 to +5.0, and a B* value of −6.0 to +8.0, is exhibited.

However, the technology disclosed in the related art document prevents a white rare earth fluoride from changing in color, during a thermal spraying process, from white to a color in a range of gray to black by adjusts only the lightness. Since the technology cannot control the color, the technology has limitations on achievement of good color uniformity.

The present disclosure is intended to solve the problems. To this end, the present disclosure provides a thermal spraying powder having a novel composition having the advantages: preventing black spots from being formed on a thermal spray coating; preventing a thermal spray coating from turning black; and forming a high density thermal spray coating with good mechanical properties. The present disclosure also provides a thermal spray coating formed from the powder.

DOCUMENTS OF RELATED ART

Patent Document

Patent Document 001: Korean Patent Application Publication No. 10-2020-0120537 (publication date: Oct. 21, 2020)

Patent Document 002: Korean Patent No. 10-2266656 (registration date: Jun. 14, 2021)

Patent Document 003: Korean Patent Application Publication No. 10-2019-0122753 (publication date: Oct. 30, 2019)

SUMMARY OF THE INVENTION

In order to solve the problems occurring in the related art, one objective of the present invention is to provide an yttrium-based powder for thermal spraying, the powder including a yttrium-based compound and an optimally controlled amount of an oxide additive, $SiO_2$, the powder having the advantages of inhibiting black spots from being formed or the yttrium-based compound from turning black through thermal spraying, of improving mechanical properties of a thermal spray coating, and of changing the color of a thermal spray coating being formed.

Another objective of the present disclosure is to provide a thermal spray coating formed by thermal spraying of the yttrium-based powder.

To achieve one objective, according to a first aspect of the present disclosure, there is provided an yttrium-based powder for thermal spraying, the powder including an yttrium-based compound and 30% by weight or less of an oxide additive, $SiO_2$.

In one embodiment, the yttrium-based compound may be any one selected from $Y_2O_3$, YOF, $YF_3$, $Y_4Al_2O_9$, $Y_3Al_5O_{12}$, and $YAlO_3$.

According to a second aspect of the present disclosure, there is provided a thermal spray coating formed on base member by thermal spraying of the yttrium-based powder.

In one embodiment, the thermal spray coating may have the following chromaticity values: an L* value of 50 to 95, an a* value of −5.0 to 10, and a b* value of −1 to 20 measured with a colorimeter (CIE Lab).

In one embodiment, the thermal spray coating may have photoluminescence (PL) peaks at 380 to 440 nm and at 780 to 840 nm.

In one embodiment, the difference between 2θ of an XRD peak and 2θ of a standard peak of the thermal spray coating may be in a range of −0.10 to 0.10.

In one embodiment, the thermal spray coating may have a porosity of less than 1% and a hardness value of 500 to 700 Hv.

In one embodiment, the powder may be plasma sprayed at a distance of 50 to 400 mm from a base member.

The color or lightness of the coating formed by thermal spraying of the yttrium-based powder of the present disclosure can be controlled during formation, and the coating has high density and thus exhibits good mechanical properties.

DESCRIPTION OF EXEMPLARY EMBODIMENTS

Figure 1:
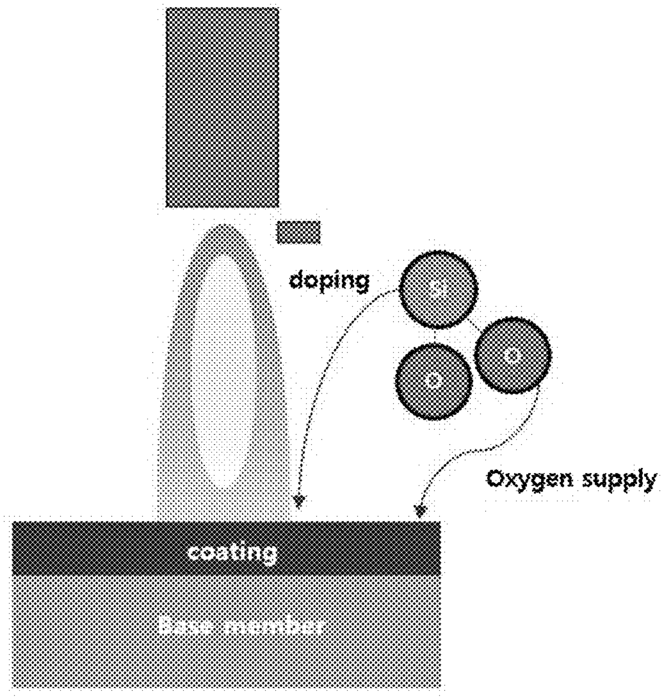
FIG. 1 is a schematic diagram illustrating a process of spraying a thermal spraying powder according to one embodiment of the present disclosure.

Hereinafter, preferred embodiments of the present disclosure that can be easily implemented by those skilled in the art will be described in detail. In describing the principles employed in the preferred embodiments of the present disclosure, well-known functions or constructions will not be described in detail when they may obscure the gist of the present disclosure.

Unless otherwise defined, all terms including technical and scientific terms used herein have the same meaning as commonly understood by those who are ordinarily skilled in the art to which the present disclosure pertains. In general, the nomenclature used herein is one well known and commonly used in the art.

It will be further understood that the terms "comprise", "include", or "have", when used in this specification, specify the presence of an element, but do not preclude the presence or addition of one or more other elements unless the context clearly indicates otherwise.

The present disclosure relates to an yttrium-based powder for thermal spraying, the powder including an yttrium-based compound and an optimally controlled amount of an oxide additive, $SiO_2$, as well as to yttrium-based thermal spray coating formed by thermal spraying with the said yttrium-based powder. By controlling the content of the oxide additive, it is possible to prevent black spots from being formed or the yttrium-based compound from turning black through thermal spraying. In addition, it is possible to control the color and improve the mechanical properties of a thermal spray coating formed.

Hereinafter, the present disclosure will be described in detail.

In a first aspect of the present disclosure, there is provided an yttrium-based powder for thermal spraying, the yttrium-based powder including an yttrium-based compound and 30% by weight or less of an oxide additive, $SiO_2$.

In the present disclosure, the yttrium-based compound is a compound containing yttrium. Examples of the yttrium-based compound include yttrium fluoride, yttrium oxide, and yttrium oxyfluoride, and the yttrium-based compound is not particularly limited. For example, the yttrium-based compound may be at least one selected from $Y_2O_3$, YOF, $YF_3$, $Y_4Al_2O_9$, $Y_3Al_5O_{12}$, and $YAlO_3$. The yttrium-based compound is in the form of granular powder having an average particle size of 0.1 to 50 μm and may be included in an amount of 70 to less than 99 wt %.

When the yttrium-based compound is included in an amount of less than 70 wt %, an unwanted secondary phase may be formed. When the yttrium-based compound is included in an amount of wt. 99 or more, since the content of the oxide additive is relatively small compared to the content of the yttrium-based compound, the following problems may occur: during plasma thermal spray coating, black spots or black coatings may be formed due to deoxidation; the phenomenon of partial coloration from white to black due to the effect of plasma etching may occur; and the etching rate increases due to an unstable chemistry state, or process condition changes due to change in radiation absorptivity.

Therefore, the yttrium-based compound is included in an amount of 70 wt % or more and less than 99 wt %. The amount of the yttrium-based compound varies depending on the amount of the oxide additive added.

The size of the granular powder of the yttrium-based compound is in a range of from 0.1 to 50 μm. This is because the particles with sizes of less than 0.1 μm have an excessively large specific surface area. This excessively large specific surface area lowers the surface energy, thereby causing aggregation of the particles. In addition, when the mass of a particle is small, the change in velocity is large even with a small force, so the particle cannot enter the center of the plasma. Since the temperature and momentum outside a plasma zone are low, the particle disposed outside the plasma zone does not sufficiently melt and the bonding strength of the particle with the base member is not strong due to the low kinetic energy. As a result, a low density coating is formed. When a granular powder with a particle diameter of larger than 50 μm is used, the formed coating has low density because the powder particles cannot enter and fill fine pores during the formation of the coating due to their large sizes, and the coating has a rough surface because large droplets are formed on the coating surface.

Preferably, the yttrium-based compound is yttrium oxide ($Y_2O_3$). In terms of the crystal structure of the yttrium oxide, a monoclinic form may be included in an amount of 0 to 50 wt %.

In the present disclosure, the oxide additive is a material added to control the color of a coating and to improve the mechanical properties of a coating while preventing black spots or black coatings during a process in which the yttrium-based compound is sprayed through plasma thermal spraying. Specifically, the oxide additive is $SiO_2$ and is included in an amount of 30 wt % or less.

Preferably, the oxide additive, $SiO_2$, is included in an amount of 1 to 30 wt %. When the oxide additive is included in an amount of less than 1 wt %, black spots or black coatings may be formed due to an insufficient oxygen supply during the formation of a thermal spray coating. In addition, colors such as red and yellow cannot be displayed, and the degree of improvement in hardness is insignificant. When the content of the oxide additive exceeds 30 wt %, undesirable secondary phases may be formed.

In this case, the average particle diameter of the oxide additive, $SiO_2$, is 0.1 to 10 μm.

When the average particle diameter is smaller than 0.1 μm, sufficient oxygen supply and Si doping cannot be achieved owing to vaporization by plasma heat energy caused by reduction of the total heat capacity. When the average particle diameter is larger than 10 μm, the heat transfer to the center of each $SiO_2$ particle is insufficient, resulting insufficiently uniform oxygen supply due to lack of diffusion or dissolution. Therefore, $SiO_2$ particles may remain in the coating.

The yttrium-based powder for thermal spraying according to the present invention forms a thermal spray coating through thermal spraying.

Specifically, the thermal spray coating is formed by plasma thermal spraying using an yttrium-based powder containing 1 to 30 wt % of the oxide additive, $SiO_2$, and 70 wt % or more and less than 99 wt % of the yttrium-based compound. In this case, the thermal spray coating has an L* value of 50 to 95, an a* value of −5.0 to 10, and a b* value of −1 to 20 when measured with a colorimeter (CIE Lab).

The CIE Lab is a color coordinate system representing colors with L, a, and b values, in which L represents the lightness, and the a and b represent complementary colors with the degrees of red (+) and green (−) and the degrees of yellow (+) and blue (−), respectively. The L, a, and b are spatial coordinates like X, Y, and Z in a three-dimensional mathematical coordinate system. That is, complementary colors of red and green and complementary colors of blue and yellow are arranged at both ends of the a-axis and the b-axis, respectively of the Cartesian coordinate, and the L-axis orthogonal to the ab plane indicates lightness (luminance). Each point at which the axes intersect represents a color.

The yttrium-based thermal spray coating of the present disclosure has an L value of 50 to 95, an a value of −5.0 to 10, and a b value of −1 to 20 measured with a colorimeter (CIE Lab). The yttrium-based thermal spray coating displays diverse colors ranging from a bright color close to white to red, to green, and to yellow. Preferably, the thermal spray coating has an L value of 80 to 95, an a value of −3.0 to 5, and a b value of −0.3 to 10, and the color of the thermal spray coating varies depending on the content of the oxide additive in the yttrium-based powder for thermal spraying.

For example, when the content of the oxide additive is in the range of from 10 to 15 wt %, the thermal spray coating has an L value of 80 to 95, an a value of 1 to 5, and a b value of 1 to 5, expressing red chromaticity. When the content of the oxide additive is in the range of from 15 to 30 wt %, the thermal spray coating has an L value of 80 to 90, an a value of −3.0 to 0, and a b value of 2 to 10, expressing yellow chromaticity.

In addition, the thermal spray coating shows peaks at 380 to 440 nm and 780 to 840 nm when measuring photoluminescence (PL), and the intensity of each peak in the range varies depending on the chromaticity values measured with a colorimeter (CIE Lab).

For example, when the L value is 80 to 95, the a value is 1 to 5, and the b value is 1 to 5, expressing red chromaticity, the peak intensity values are 1000 to 10,000 counts at 380 to 440 nm and 300 to 800 counts at 780 to 840 nm. When the L value is 80 to 90, the a value is −3.0 to 0, and the b value is 2 to 10, expressing yellow chromaticity, the peak intensity values are 10,000 counts or more at 380 to 440 nm and 600 counts or more at 780 to 840 nm.

In addition, the difference between the 2θ of the XRD peak of the thermal spray coating and the 2θ of the standard peak of the thermal spray coating may be adjusted in the range of −0.10° to 0.10° depending on the content of the oxide additive.

Figure 2:
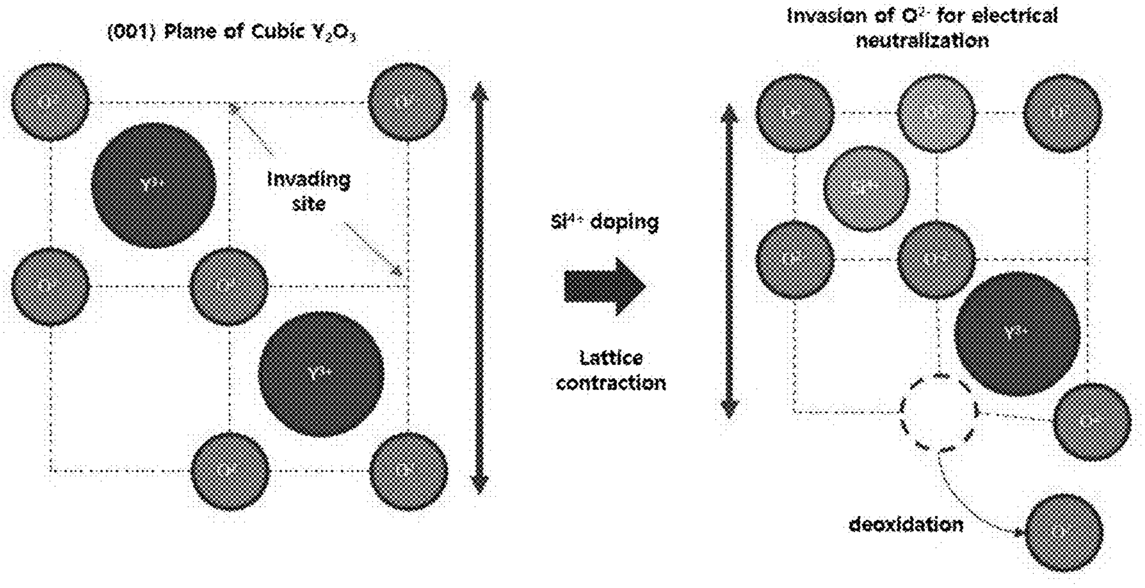
FIG. 2 is a diagram showing a change in lattice structure of $Y_2O_3$ according to the content of an oxide additive according to an embodiment of the present disclosure.
Figure 3:
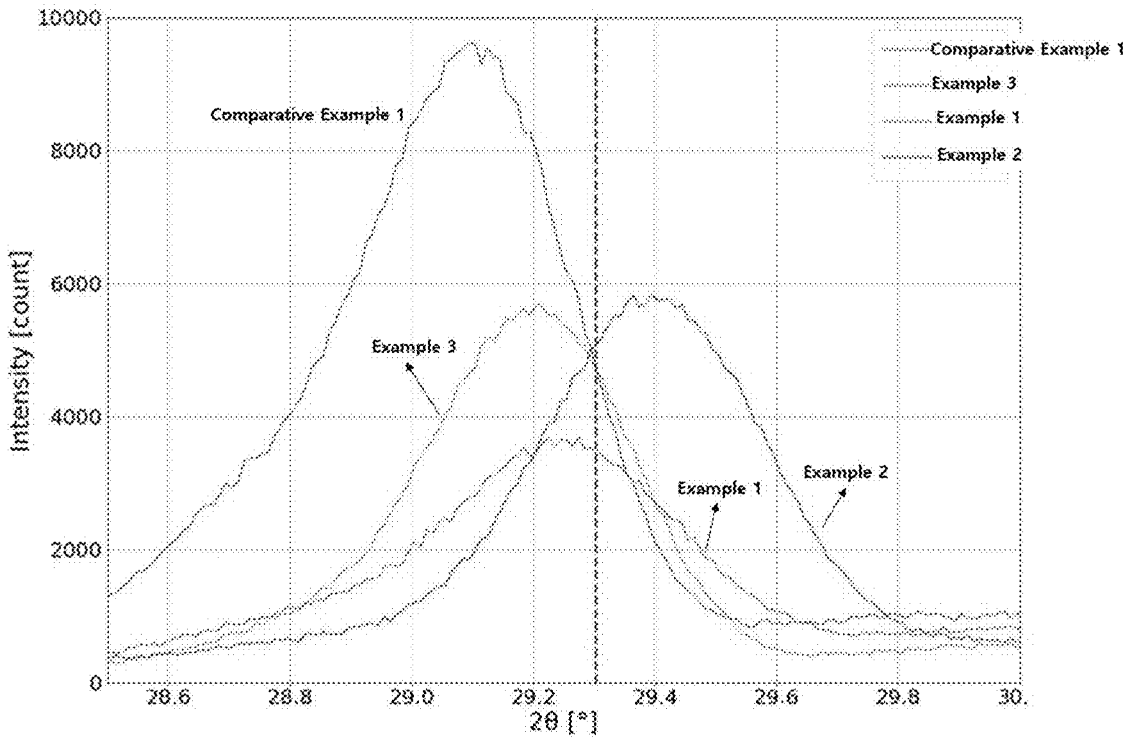
FIG. 3 is an XRD analysis graph related to an embodiment of the present disclosure.

FIGS. 2 and 3 illustrate embodiments for a lattice structure change and the resulting XRD change when an oxide additive ($SiO_2$) is introduced into the (001) plane of $Y_2O_3$ having a square structure. By the replacing the position of $Y^{3+}$ with $Si^{4+}$, $Y_2O_3$ is doped and $O^{2-}$ invades to give electrical neutrality with $Si^{4+}$ in the lattice. Since $Y^{3+}$ is replaced with $Si^{4+}$ having a smaller atomic diameter than $Y^{3+}$, the lattice contraction occurs. This lattice contraction causes the XRD peak to shift to the right, and this tendency intensifies as the content of the oxide additive increases. Meanwhile, the standard peak is the peak value of $Y_2O_3$ having an ideal tetragonal structure having no lattice deformation. In general, the peak of $Y_2O_3$ appears on the left side of the standard peak due to tensile stress during thermal spray coating.

In the present disclosure, the coating is formed by plasma thermal spraying at a distance of 50 to 400 mm from a base member. When thermal spraying is performed on the base member being positioned at an insufficient distance from a plasma gun, since the travel distance of melted particles is short, deoxidation occurs. On the other hand, when the distance between the base member and the plasma gun is excessively distant to prevent the problem, the temperature of the melted particles is lowered while the particles travel to reach the surface of the base member. This makes the incompletely melted particles form a coating. Furthermore, the excessively long travel distance results in a decrease in the momentum of the particles, which weakens the bombardment of the particles to the base member, resulting in a coating with low density and low hardness. In addition, since the melting point of the powder to which the oxide additive is added is lowered, the powder particles can be well melted. When the particles are well melted, the hardness of the formed coating increases.

Therefore, when the distance between the base member and the plasma gun is insufficient, the melted particles travel short distance. In this case, deoxidation occurs, but the temperature and momentum of the particles are high. The well melted particles can make strong bombardments against the base member and are thus well spread on the surface of the base member. Thus, a coating with high density and high hardness can be obtained.

In addition, the thermal spray coating of the present disclosure is formed by plasma spraying of the yttrium-based thermal spraying powder at a short distance of 50 to 400 mm from the base material, so that the coating has a porosity of less than 1% and a hardness value of 500 to 700 Hv, exhibiting good mechanical properties.

Hereinafter, the present disclosure will be described in greater detail with reference to specific examples. However, the examples described below are presented only to aid understanding of the present disclosure and thus should not be construed as limiting to the scope of the present disclosure.

EXAMPLE

Preparation Example: Preparation of Yttrium-Based Powder for Thermal Spraying An yttrium-based compound powder $Y_2O_3$ (atomic ratio (at %) of yttrium element and oxygen element=2:3) and an oxide additive ($SiO_2$) powder were mixed with a binder, and then the mixture was dried using a spray dryer to obtain a coarse powder. Thereafter, the coarse powder was degreased and then sintered to obtain an yttrium-based powder for thermal spraying.

Table 1 below summarizes the components, powder size, and mixing ratio of the prepared yttrium-based powder for thermal spraying.

TABLE 1

| | Component | Size (μm) of granulated powder | Mixing ratio (wt %) of primary powder |
|---|---|---|---|
| Preparation Example 1 | $Y_2O_3$ | 1-30 | 100.0 |
| Preparation Example 2 | $Y_2O_3$ | 1-50 | 90.0-99.0 |
| | $SiO_2$ | 0.1-10 | 1.0-10.0 |
| Preparation Example 3 | $Y_2O_3$ | 1-50 | 85.0-90.0 |
| | $SiO_2$ | 0.1-10 | 10.0-15.0 |
| Preparation Example 4 | $Y_2O_3$ | 1-50 | 70.0-85.0 |
| | $SiO_2$ | 0.1-10 | 15.0-30.0 |

Formation of Plasma Sprayed Coating

APS coatings were formed through atmospheric plasma spraying on base members using each of the powders prepared according to Preparation Examples 1 to 4. The flow rate of an insert gas was 10 to 100 NLPM, and the plasma generation current was 200 to 800 A. The feeder of a plasma gun was positioned at 50 to 400 mm from the base material. The distance was varied, and the feeder was moved at a speed of 1 to 100 g/min.

Table 2 below summarizes the conditions under which the APS coatings were formed according to examples and comparative examples.

TABLE 2

| | Powder No. | Plasma conditions Ar (NLPM) | Current (A) | Feeder conditions Feeding rate (g/min) | Distance (mm) |
|---|---|---|---|---|---|
| Example 1 | Preparation Example 3 | 10-100 | 200-800 | 10-100 | 50-100 |
| Example 2 | Preparation Example 4 | 10-100 | 200-800 | 10-100 | 50-100 |
| Example 3 | Preparation Example 2 | 10-100 | 200-800 | 10-100 | 50-100 |

TABLE 2-continued

| | Powder No. | Plasma conditions Ar (NLPM) | Current (A) | Feeder conditions Feeding rate (g/min) | Distance (mm) |
|---|---|---|---|---|---|
| Comparative Example 1 | Preparation Example 1 | 10-100 | 200-800 | 10-100 | 200-400 |
| Comparative Example 2 | Preparation Example 1 | 10-100 | 200-800 | 10-100 | 50-100 |

Analysis of Coating Film

Figure 4:
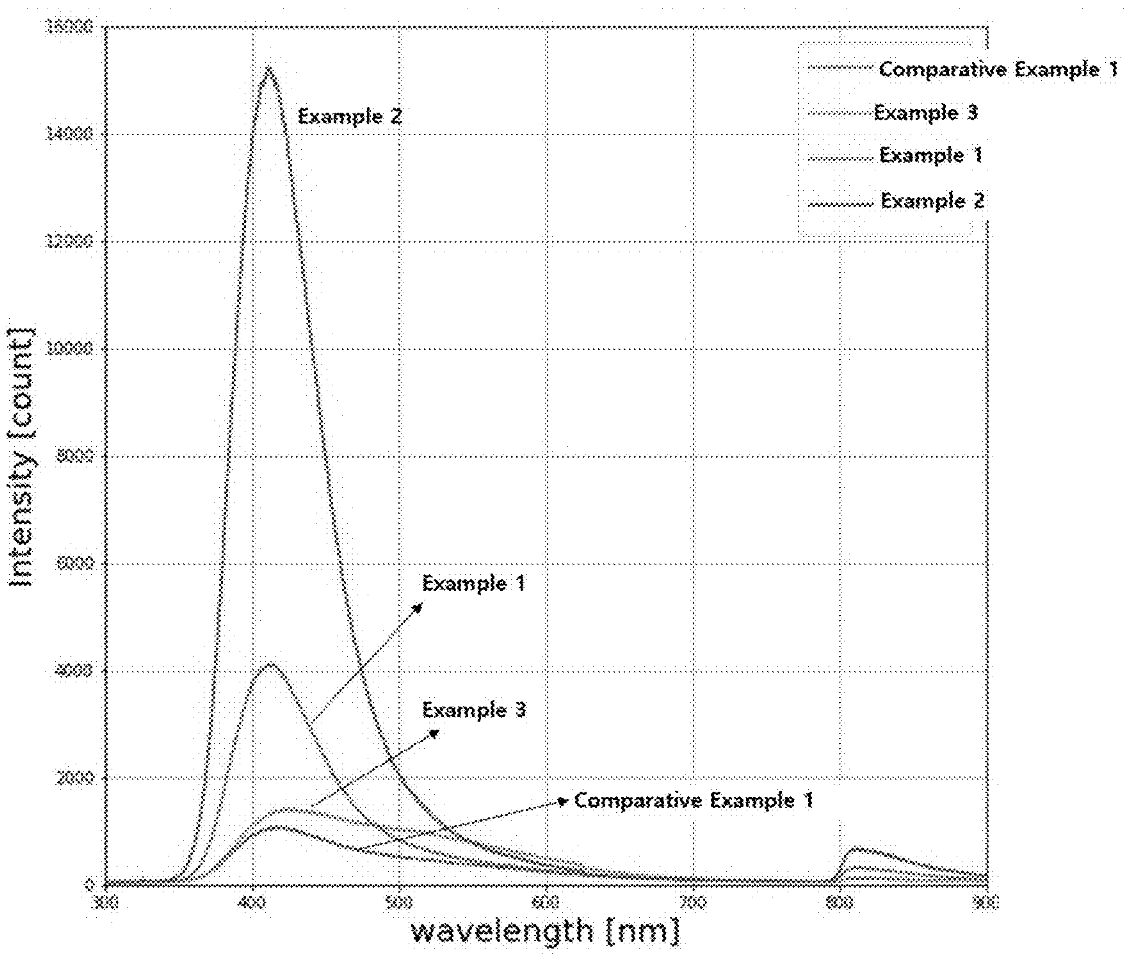
FIG. 4 is a PL analysis graph related to an embodiment of the present disclosure.

For each of the prepared coating films, the color, X-ray diffraction (XRD), photoluminescence (PL), porosity, and hardness were measured. The results are shown in Table 3 and FIGS. 2 to 4. Analysis methods are described below.

Color analysis: Human eye visual observation and Colorimeter (CIE Lab) measurement X-ray diffraction analysis: Measurement of position change by setting the XRD 2θ value of ideal $Y_2O_3$ having no lattice deformation as a standard peak position (29.302°)

PL: Comparison of relative intensities of peaks at 380 to 440 nm and 780 to 840 nm Porosity and hardness: porosity analysis was performed through cross-section SEM analysis, and hardness measurement was performed with a Vickers hardness tester It was confirmed that the color of the coating varied depending on the content of the oxide additive. In the PL analysis of FIG. 4, it was confirmed that the intensities of the peaks at 380 to 440 nm and 780 to 840 nm increased as the content of $SiO_2$ increased. Due to the energy level between the two positions, the color changed among white, red, and yellow according to the content of $SiO_2$. That is, the color of the coating is yellow in Example 2 in which the content of the oxide additive $SiO_2$ is in a range of 15 to 30 wt %, red in Example 1 in which the content of the oxide additive $SiO_2$ is in a range of 10 to 15 wt %, and white in Example 3 in which the content of the oxide additive $SiO_2$ is in a range of 0.1 to 10 wt %.

Referring to the XRD peaks of Table 3 and FIG. 3, it is noted that the value of the measured peak position—the standard peak position increases with increase in the content

TABLE 3

| | Human eye observation color | Colorimeter (CIE Lab) L | a | b | XRD peak position (°) Measured peak position | Measured peak position-*Standard peak position | PL peak intensity (Count) 380 to 440 nm | 780 to 840 nm | Porosity (%) | Hardness (Hv) |
|---|---|---|---|---|---|---|---|---|---|---|
| Exam. 1 | Red | 84.39 | 1.10 | 3.34 | 29.231 | −0.071 | 4,183 | 371 | <1.0 | 500~700 |
| Exam. 2 | Yellow | 86.62 | −2.08 | 8.36 | 29.400 | 0.098 | 14,845 | 663 | <1.0 | 500~700 |
| Exam. 3 | White | 89.46 | −0.40 | −0.67 | 29.197 | −0.105 | 1,397 | 120 | <1.0 | 500~700 |
| Comp. Exam. 1 | White | 89.74 | −0.16 | −0.26 | 29.092 | −0.210 | 1,024 | 43 | <1.5 | 400~450 |
| Comp. Exam. 2 | Black | 39.37 | −0.56 | 0.07 | — | — | — | — | <1.0 | 400~450 |

Looking at Table 3, Comparative Example 1 and Comparative Example 2 are the cases in which the thermal spray coating was formed only with an yttrium-based compound. In the case of Comparative Example 2 in which the distance was 50 to 100 mm, since the distance was insufficient, deoxidation occurred on the surface of the coating, and the coating surface appears black. On the other hand, when the distance is increased from 200 nm to 400 mm, the surface appears white.

In addition, Comparative Example 1 and Comparative Example 2 show lower hardness values than Examples. The coating of Comparative Example 1 has white color and exhibits a relatively high porosity of less than 1.5%.

In the case of Examples 1 to 3 in which 30 wt % or less of an oxide additive, $SiO_2$, was added to the yttrium-based compound, higher density coatings than the coatings of the comparative examples were formed, and the coatings had a porosity of less than 1% and a hardness value of 500 to 700 Hv, exhibiting good mechanical properties. The coatings appeared red, yellow, or white depending on the content of the oxide additive.

of the additive $SiO_2$. This is because as the content of the additive, $SiO_2$, is increased, the amount of Si' dopants is increased, lattice contraction occurs, and the peak shifts to the right. The change in the peak value indicates that Si doping was performed. On the other hand, in the case of Comparative Example 1 in which the additive $SiO_2$ is not used, the peak appears on the left side of the standard peak having no lattice deformation. This is because, due to the nature of the APS process, the tensile stress acts on the coating and thus the peak shifts to the left compared to the ideal $Y_2O_3$ having no lattice deformation.

In addition, Comparative Example 2 shows black color at a separation distance of 50 to 100 mm, whereas Example 3 shows white color at the same separation distance. This is because the additive $SiO_2$ supplies oxygen (O) to the coating, thereby inhibiting black spots or black coatings that are caused by deoxidation.

What is claimed is:

1. A yttrium-based thermal spray coating formed on a base material, the yttrium-based thermal spray coating comprising:

an yttrium-based powder including:

an yttrium-based compound selected from any one of $Y_2O_3$, YOF, $YF_3$, $Y_4Al_2O_9$, $Y_3Al_5O_{12}$, $YAlO_3$, or any combination thereof; and an oxide additive of $SiO_2$ in an amount of more than 10 wt % but 30 wt % or less based on a total weight of the yttrium-based powder, wherein the yttrium-based thermal spray coating has an L value of 80 to 95, an a value of −3.0 to 5, and a b value of −1.0 to 10 in chromaticity representation of a colorimeter (CIE Lab).

2. The yttrium-based thermal spray coating of claim 1, wherein the coating has photoluminescence (PL) peaks at 380 to 440 nm and at 780 to 840 nm.

3. The yttrium-based thermal spray coating of claim 1, wherein a difference between 2θ of an X-ray diffraction (XRD) peak and 2θ of a standard peak of the yttrium-based thermal spray coating is −0.10 to 0.10.

4. The yttrium-based thermal spray coating of claim 1, wherein the yttrium-based thermal spray coating has a porosity of greater than 0% but less than 1% and a hardness of 500 to 700 Hv.

5. The yttrium-based thermal spray coating of claim 1, wherein the yttrium-based thermal spray coating is formed by plasma spraying performed at a distance of 50 mm to 400 mm from the base material.

* * * * *